United States Patent
Liao (10) Patent No.: US 7,967,493 B2
(45) Date of Patent: Jun. 28, 2011

(54) LIGHT GUIDE PLATE AND BACKLIGHT MODULE USING THE SAME

(75) Inventor: Super Liao, Hsin-Chu (TW)

(73) Assignee: AU Optronics Corp., Hsinchu (TW)

( * ) Notice: Subject to any disclaimer, the term of this patent is extended or adjusted under 35 U.S.C. 154(b) by 219 days.

(21) Appl. No.: 12/277,375

(22) Filed: Nov. 25, 2008

(65) Prior Publication Data

US 2010/0091520 A1 Apr. 15, 2010

(30) Foreign Application Priority Data

Oct. 15, 2008 (TW) .............................. 97139569 A (51) Int. Cl.
*F21V 7/04* (2006.01)
(52) U.S. Cl. ....................................... 362/625; 362/623
(58) Field of Classification Search .................. 362/330, 362/339, 606, 612, 614, 615, 617, 619, 620, 362/623, 625, 626
See application file for complete search history.

(56) References Cited

U.S. PATENT DOCUMENTS

| 6,752,507 B2 * | 6/2004 | Wang et al. .................... 362/330 |
| 6,854,855 B2 * | 2/2005 | Munro et al. .................. 362/620 |
| 6,971,782 B2 * | 12/2005 | Nagakubo et al. ............. 362/625 |
| 2009/0059621 A1 * | 3/2009 | Takahashi et al. ............. 362/619 |

FOREIGN PATENT DOCUMENTS

CN 1664672 A 9/2005

* cited by examiner

*Primary Examiner* — Y My Quach Lee
(74) *Attorney, Agent, or Firm* — Chun Ming Shih (57) ABSTRACT

A light guide plate has a light incident surface, a light emitting surface and a bottom surface. The bottom surface or the light emitting surface has a plurality of light guide units disposed thereon. Each of the light guide units has a first curved surface and a second curved surface connected with the first curved surface. Both of the first curved surface and the second curved surface are concave surfaces or convex surfaces. In a cross section perpendicular to the light incident surface and passing through the first curved surface and the second curved surface, the first curved surface and the cross section intersect in a first curved line, and the second curved surface and the cross section intersect in a second curved line. A curvature radius of the first curved line is greater than that of the second curved line.

9 Claims, 5 Drawing Sheets

LIGHT GUIDE PLATE AND BACKLIGHT MODULE USING THE SAME

BACKGROUND

1. Field of the Invention

The present invention relates to a plane light source device, and more particularly to a backlight module and a light guide plate used in the backlight module.

2. Description of the Related Art

With the development of flat panel display technique, flat panel displays (FPDs) that have advantages of light in weight, small in size and low power consumption are becoming more and more popular. Typically, the flat panel displays include liquid crystal displays (LCDs), plasma panel displays (PDPs), organic light emitting diode displays (OLED displays) and electrophoretic displays (EPDs). Among the flat panel displays, the liquid crystal displays are most widely used.

The liquid crystal display includes a liquid crystal display panel and a backlight module. The backlight module is used to provide a plane light source to the liquid crystal display panel. Generally, the backlight module may be classified into a direct type backlight module and a sidelight type backlight module based on a transmission mode of light.

Figure 1A:
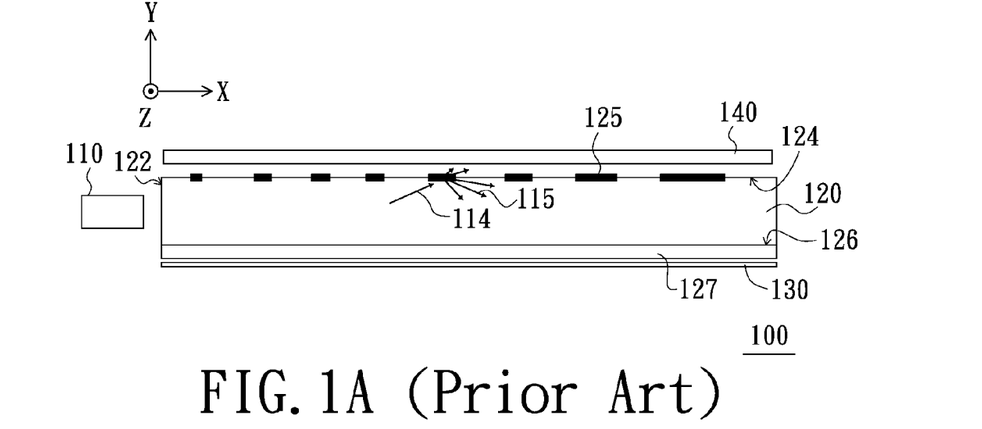
FIG. 1A is a schematic view of a conventional sidelight type backlight module.
Figure 1B:
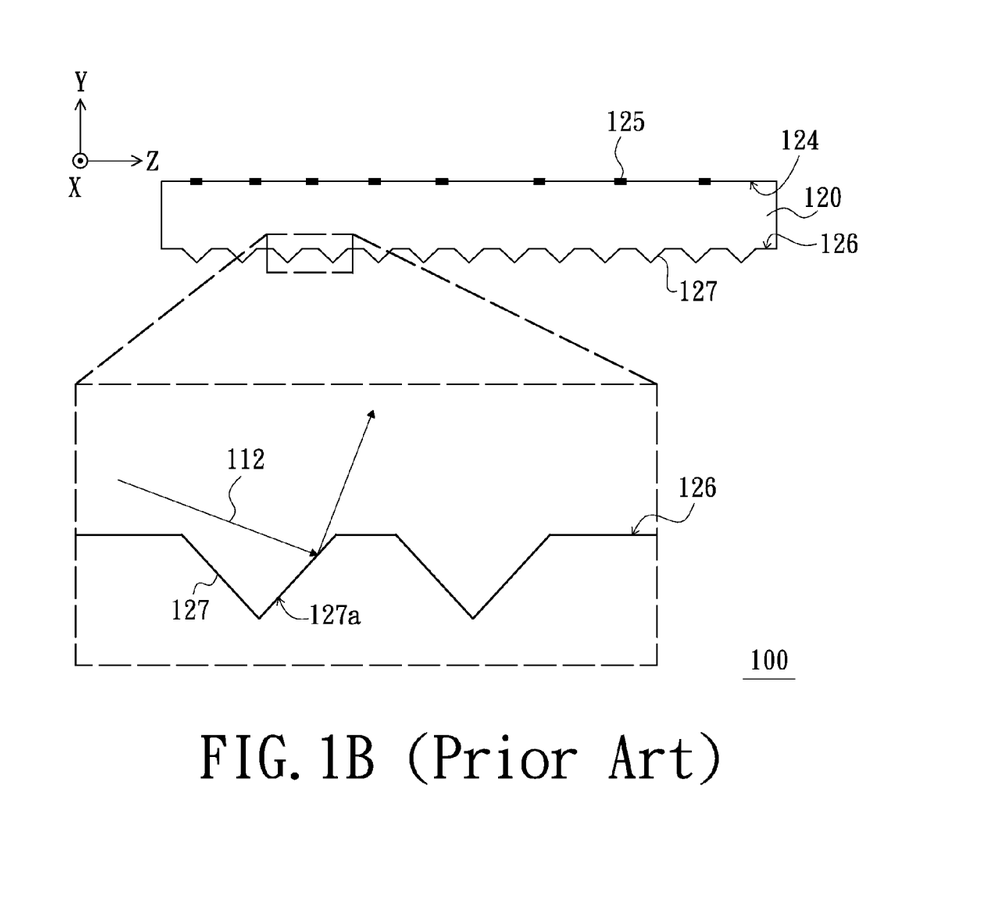
FIG. 1B is a schematic side view showing a light guide plate of FIG. 1A.

FIG. 1A is a schematic view of a conventional sidelight type backlight module. FIG. 1B is a schematic side view showing a light guide plate of FIG. 1A. Referring to FIGS. 1A and 1B, the conventional backlight module 100 includes a light source 110, a light guide plate 120, a reflective sheet 130 and an optical sheet 140. The light guide plate 120 includes a light incident surface 122, a light emitting surface 124 and a bottom surface 126. The light emitting surface 124 is opposite to the bottom surface 126. The light incident surface 122 is connected between the light emitting surface 124 and the bottom surface 126. The light source 110 is disposed adjacent to the light incident surface 122. The reflective sheet 130 is disposed under the bottom surface 126. The optical sheet 140 is disposed above the light emitting surface 124. In addition, a plurality of sandblasted structures 125 is formed on the light emitting surface 124, and a plurality of V-shaped light guide units 127 is formed on the bottom surface 126.

When a portion of light rays (such as light ray 112) provided by the light source 110 transmits to a surface 127a of the V-shaped light guide unit 127, the portion of light rays (such as light ray 112) would be totally reflected, and a light emitting angle of the portion of light rays (such as light ray 112) is relatively small when emitting from the light emitting surface 124. In the conventional backlight module 100, the portion of light rays (such as light ray 112) which is totally reflected can be utilized. In addition, the light rays (such as light ray 114) transmitting to the sandblasted structures 125 would be diffused. However, a portion of the diffused light rays (such as light ray 115) could not emit from the light emitting surface 124. Accordingly, light emitting efficiency of the conventional light guide plate 120 would be reduced, and light utilization efficiency of the conventional backlight module 100 would be decreased. In addition, the sandblasted structures 125 would make it difficult to control the light emitting angle of the light rays. Consequently, brightness and uniformity of the light rays emitting from the light guide plate 120 are not easily adjusted, and the light emitting surface 124 of the light guide plate 120 may appear some bright areas (or bright strips) and dark areas (or dark strips).

BRIEF SUMMARY

The present invention relates to a light guide plate that can improve light utilization efficiency.

The present invention also relates to a backlight module for providing a plane light source having relatively high brightness.

To achieve at least one of the above-mentioned advantages, the present invention provides a light guide plate. The light guide plate has a light incident surface, a light emitting surface and a bottom surface. The bottom surface is opposite to the light emitting surface. The light incident surface is connected between the light emitting surface and the bottom surface. The bottom surface or the light emitting surface has a plurality of light guide units disposed thereon. Each of the light guide units has a first curved surface and a second curved surface connected with the first curved surface. Both of the first curved surface and the second curved surface are concave surfaces or convex surfaces. In a cross section perpendicular to the light incident surface and passing through the first curved surface and the second curved surface, the first curved surface and the cross section intersect in a first curved line, and the second curved surface and the cross section intersect in a second curved line. A curvature radius of the first curved line is greater than that of the second curved line.

In an embodiment of the present invention, a joint of the first curved surface and the second curved surface is located at a first reference plane parallel with the light incident surface.

In an embodiment of the present invention, the curvature radius of the first curved line is R1, and 100 micrometers<R1<∞. The curvature radius of the second curved line is R2, and 100 micrometers<R2<300 micrometers.

In an embodiment of the present invention, an included angle defined between a tangent of any one of points on the first curved line and a second reference plane parallel with the bottom surface and the light emitting surface is in the range from 0.1 degrees to 15 degrees. An included angle defined between a tangent of any one of points on the second curved line and the second reference plane is in the range from 10 degrees to 60 degrees.

In an embodiment of the present invention, the light guide units are protruded out from the bottom surface. In each of the light guide units, the second curved line is nearer to the light incident surface relative to the first curved line. In addition, both of the first curved line and the second curved line are convex lines.

In an embodiment of the present invention, the light guide units are concaved in the bottom surface. In each of the light guide units, the first curved line is nearer to the light incident surface relative to the second curved line. In addition, both of the first curved line and the second curved line are concave lines.

In an embodiment of the present invention, the light guide units are protruded out from the light emitting surface. In each of the light guide units, the first curved line is nearer to the light incident surface relative to the second curved line. In addition, both of the first curved line and the second curved line are convex lines.

In an embodiment of the present invention, the light guide units are concaved in the light emitting surface. In each of the light guide units, the second curved line is nearer to the light incident surface relative to the first curved line. In addition, both of the first curved line and the second curved line are concave lines.

In an embodiment of the present invention, a maximum length of each of the light guide units along a first direction is L1, a maximum length of each of the light guide units along a second direction is L2, the first direction is parallel with a long axis of the light incident surface, the second direction is perpendicular to the first direction, and $1 \leq L1/L2 \leq \infty$.

In an embodiment of the present invention, the light guide units are spaced from each other.

In an embodiment of the present invention, intervals between each two adjacent light guide units are different.

In an embodiment of the present invention, each two adjacent light guide units abut against each other.

To achieve at least one of the above-mentioned advantages, the present invention provides a backlight module. The backlight module includes a light source, an optical sheet and the above light guide plate. The light source is disposed adjacent to the light incident surface. The optical sheet is disposed above the light emitting surface.

In an embodiment of the present invention, the optical sheet is selected from the group consisting of a prism sheet and a diffusion sheet.

In an embodiment of the present invention, the backlight module further includes a reflective sheet disposed under the bottom surface of the light guide plate.

In the present invention, the light emitting angles of the light rays can be regulated by adjusting the curvature radiuses of the first curved line and the second curved line. Therefore, the light guide plate has relatively high light emitting efficiency. Accordingly, the backlight module using the light guide plate has relatively high light utilization efficiency. In other words, brightness of a plane light source provided by the backlight module of the present invention can be improved.

BRIEF DESCRIPTION OF THE DRAWINGS

These and other features and advantages of the various embodiments disclosed herein will be better understood with respect to the following description and drawings, in which like numbers refer to like parts throughout, and in which.

DETAILED DESCRIPTION

Reference will now be made to the drawings to describe various exemplary embodiments of the present light guide plate and backlight module using the light guide plate in detail.

Figure 2:
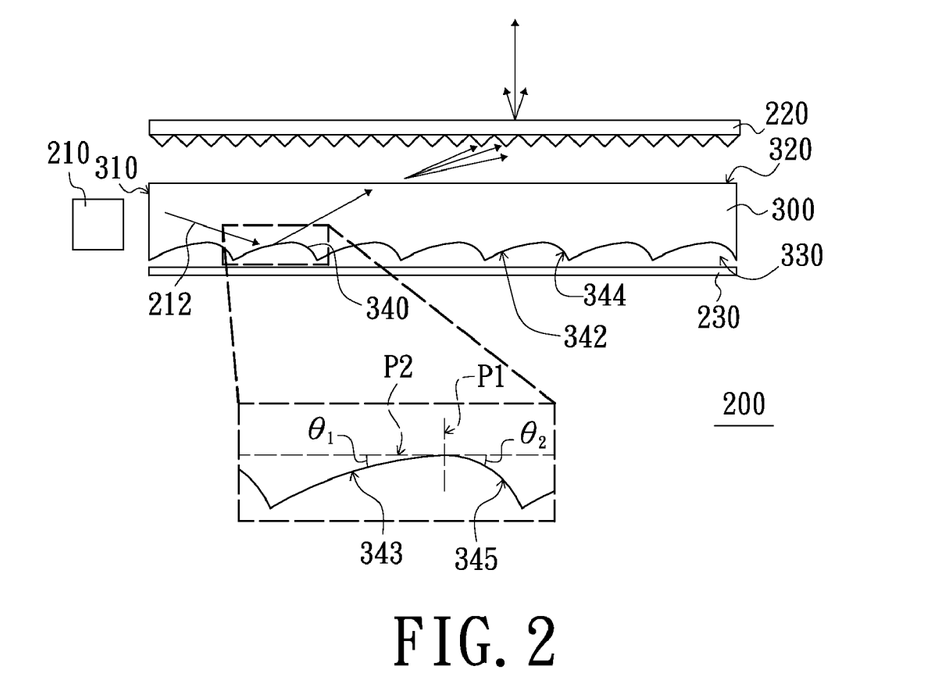
FIG. 2 is a schematic cross-sectional view of a backlight module according to an embodiment of the present invention.
Figure 3:
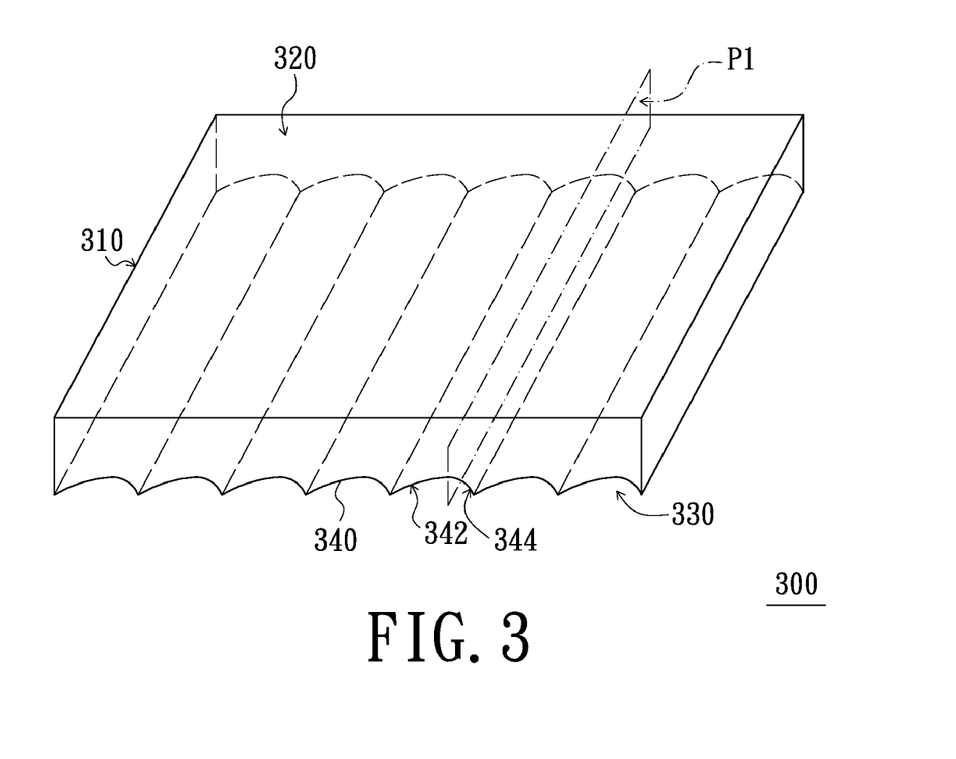
FIG. 3 is a schematic three-dimensional view showing a light guide plate of FIG. 2.

FIG. 2 is a schematic cross-sectional view of a backlight module according to an embodiment of the present invention. FIG. 3 is a schematic three-dimensional view showing a light guide plate of FIG. 2. Referring to FIGS. 2 and 3, the backlight module 200 of the present embodiment includes a light source 210, an optical sheet 220 and a light guide plate 300. The light guide plate 300 has a light incident surface 310, a light emitting surface 320 and a bottom surface 330. The bottom surface 330 is opposite to the light emitting surface 320. The light incident surface 310 is connected between the light emitting surface 320 and the bottom surface 330. The light source 210 is disposed adjacent to the light incident surface 310. The optical sheet 220 is disposed above the light emitting surface 320. The optical sheet 220 can be, but not limited to, a prism sheet. For example, the optical sheet 220 can be a diffusion sheet or a combination of the prism sheet and the diffusion sheet.

The bottom surface 330 of the light guide plate 300 has a plurality of light guide units 340 disposed thereon. Each of the light guide units 340 has a first curved surface 342 and a second curved surface 344 connected with the first curved surface 342. In a cross section (as shown in FIG. 2) that is perpendicular to the light incident surface 310 and passes through the first curved surface 342 and the second curved surface 344, a curvature radius of the first curved surface 342 is greater than that of the second curved surface 344. In specific, in the cross section that is perpendicular to the light incident surface 310 and passes through the first curved surface 342 and the second curved surface 344, the first curved surface 342 and the cross section intersect in a first curved line 343, and the second curved surface 344 and the cross section intersect in a second curved line 345. The curvature radius of the first curved line 343 is, for example, R1, and the curvature radius of the second curved line 345 is, for example, R2, wherein 100 micrometers<R1<∞, and 100 micrometers<R2<300 micrometers. A joint of the first curved surface 342 and the second curved surface 344 is located at a first reference plane P1 that is parallel with the light incident surface 310. In each of the light guide units 340, the first curved line 343 is, for example, nearer to the light incident surface 310 relative to the second curved line 345. In other words, the first curved surface 342 is nearer to the light incident surface 310 relative to the second curved surface 344. The light guide units 340 are, for example, concaved in the bottom surface 330. Both of the first curved line 343 and the second curved line 345 are, for example, concave lines. In other words, both of the first curved surface 342 and the second curved surface 344 are concave surfaces. In addition, the first curved surface 342 and the second curved surface 344 of each of the light guide units 340 can be cylinder surfaces respectively. Each two adjacent light guide units 340 abut against each other.

In this embodiment, an included angle θ1 defined between a tangent of any one of points on the first curved line 343 and a second reference plane P2 parallel with the bottom surface 330 and the light emitting surface 320 is in the range from 0.1 degrees to 15 degrees. An included angle θ2 defined between a tangent of any one of points on the second curved line 345 and the second reference plane P2 is in the range from 10 degrees to 60 degrees.

The light source 210 can be a cold cathode fluorescent lamp (CCFL), a light emitting diode (LED) or other suitable light sources. The light source 210 is used for providing light rays 212 into the light guide plate 300. Due to each of the light guide units 340 being concaved in the bottom surface 330, both of the first curved surface 342 and the second curved surface 344 being concave surfaces and the first curved line 343 with the greater curvature radius being nearer to the light incident surface 310 of the light guide plate 300 relative to the second curved line 345 (i.e., in each of the light guide units 340, the first curved surface 342 being located at left of the first reference plane P1, and the second curved surface 344 being located at right of the first reference plane P1), most of the light rays 212 can be reflected to the light emitting surface 320 of the light guide plate 300 by the first curved surfaces 342 of the light guide units 340, and then emit from the light emitting surface 320 of the light guide plate 300. Therefore, the light guide plate 300 of the present embodiment has relatively high light emitting efficiency. In the present embodiment, light emitting angles of the light rays 212 emitting from the light emitting surface 320 can be regulated by adjusting the curvature radius of the first curved line 343 and the second curved line 345. Although the light emitting angles of the light rays 212 emitting from the light emitting surface 320 are relatively greater, the light emitting angles of the light rays 212 are relatively uniform. Therefore, the light emitting angles can be corrected by the optical sheet 220 (such as prism sheet), and thus light emitting angles of the light rays 212 emitting from the optical sheet 220 can be decreased to increase light converging efficiency of the light rays 212 emitting from the optical sheet 220. In addition, because the light emitting angles of the light rays 212 emitting from the light emitting surface 320 are relatively uniform, light leakage can be reduced. Therefore, light utilization efficiency of the backlight module 200 can be improved. Accordingly, the brightness and the uniformity of a plane light source provided by the backlight module 200 of the present embodiment can be improved without increasing power consumption.

The backlight module 200 can further includes a reflective sheet 230 disposed under the bottom surface 330 of the light guide plate 300. The reflective sheet 230 can reflect the light rays 212 passing through the light guide units 340 back to the light guide plate 300. Therefore, the light utilization efficiency of the backlight module 200 can be further improved.

Figure 4A:
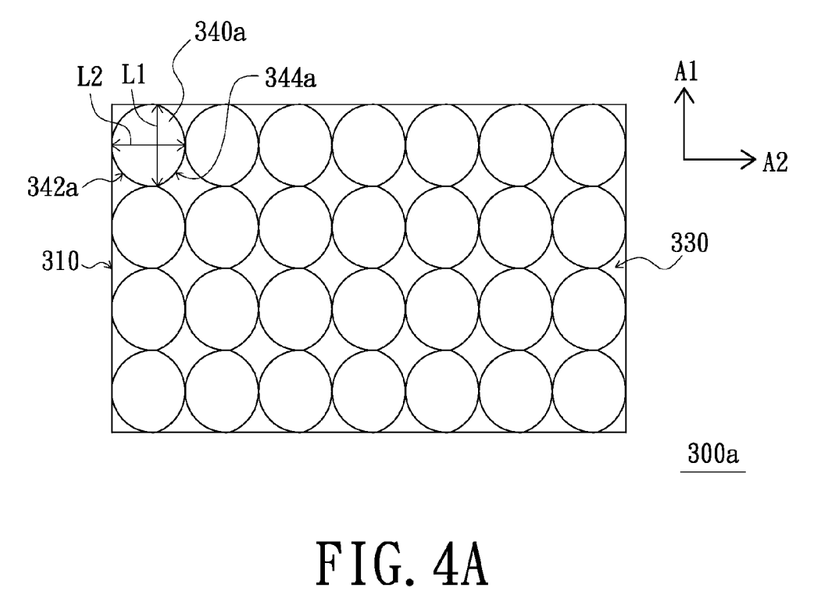
FIG. 4A is a schematic bottom view of a light guide plate according to another embodiment of the present invention.
Figure 4B:
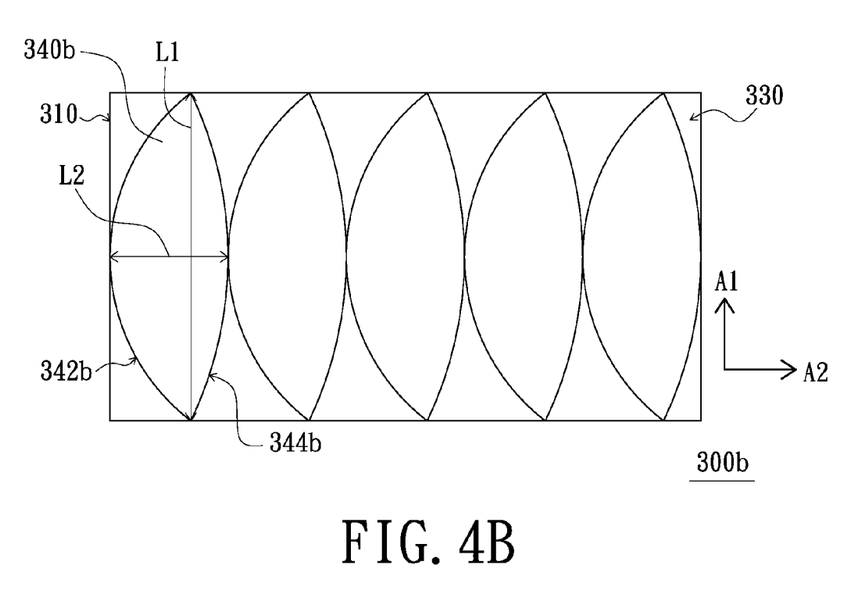
FIG. 4B is a schematic bottom view of a light guide plate according to another embodiment of the present invention.

In the present embodiment, the first curved surface 342 and the second curved surface 344 of each of the light guide units 340 are the cylinder surfaces. However, in another embodiment, the first curved surface 342 and the second curved surface 344 can be spherical surfaces. FIG. 4A is a schematic bottom view of a light guide plate according to another embodiment of the present invention. FIG. 4B is a schematic bottom view of a light guide plate according to still another embodiment of the present invention. Referring to FIGS. 4A and 4B, the light guide plates 300a and 300b are similar in principle to the light guide plate 300 of FIG. 3, and the difference between the light guide plates 300a and 300b and the light guide plate 300 lies in that each of first curved surfaces 342a and 342b and second curved surfaces 344a and 344b of light guide units 340a and 340b of the light guide plates 300a and 300b is a spherical surface. In addition, similar to the light guide plate 300, in a cross section that is perpendicular to the light incident surface 310 and passes through the first curved surface 342a/342b and the second curved surface 344a/344b, the first curved surface 342a/342b and the cross section intersect in a first curved line, and the second curved surface 344a/344b and the cross section intersect in a second curved line. A curvature radius of the first curved line is greater than that of the second curved line. The curvature radius of the first curved line is, for example, R1, and the curvature radius of the second curved line is, for example, R2, wherein 100 micrometers<R1<∞ and 100 micrometers<R2<300 micrometers. An included angle defined between a tangent of any one of points on the first curved line and a second reference plane P2 (as shown in FIG. 2) is in the range from 0.1 degrees to 15 degrees. An included angle defined between a tangent of any one of points on the second curved line and the second reference plane P2 is in the range from 10 degrees to 60 degrees.

In the light guide plate 300a/300b, a maximum length of the light guide unit 340a/340b along a first direction A1 is L1, and a maximum length of the light guide unit 340a/340b along a second direction A2 is L2. Herein, the first direction A1 is parallel with a long axis of the light incident surface 310, the second direction A2 is perpendicular to the first direction A1, and $1 \leq L1/L2 \leq \infty$. In specific, as the value of L1/L2 getting smaller, a profile of the light guide unit becomes approximating to that of the light guide unit 340a of FIG. 4A. As the value of L1/L2 getting larger, the profile of the light guide unit becomes approximating to that of the light guide unit 340b of FIG. 4B. The light guide plates 300a and 300b have advantages similar to the light guide plate 300 of FIG. 2, which will not be repeated again. The light guide plate 300 of the backlight module 200 of FIG. 2 can be replaced by one of the light guide plate 300a and the light guide plate 300b.

Figure 5:
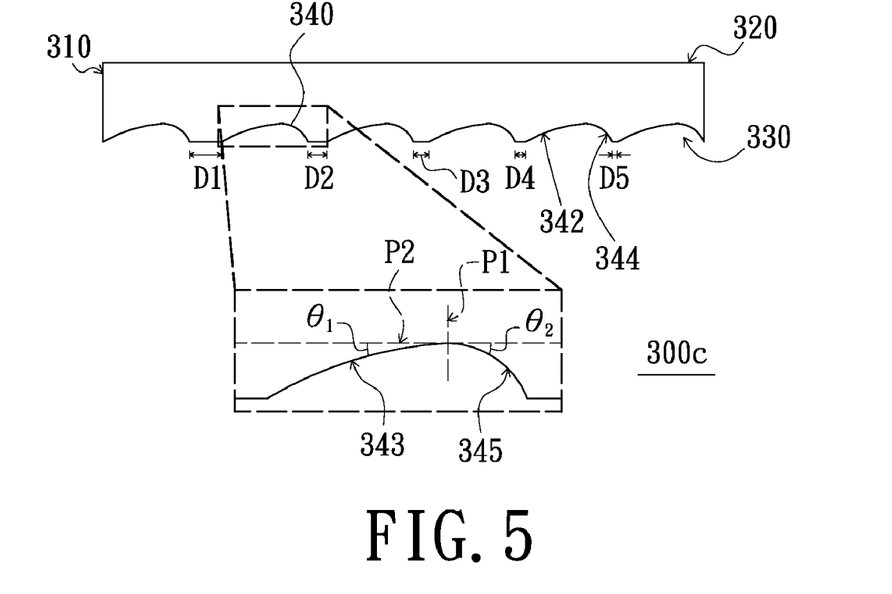
FIG. 5 is a schematic cross-sectional view of a light guide plate according to another embodiment of the present invention.

FIG. 5 is a schematic cross-sectional view of a light guide plate according to another embodiment of the present invention. Referring to FIG. 5, the light guide plate 300c of the present embodiment is similar in principle to the light guide plate 300. The difference between the light guide plate 300c and the light guide plate 300 would be described as follows. In the light guide plate 300, each two adjacent light guide units 340 abut against each other. However, in the light guide plate 300c, each two adjacent light guide units 340 disposed on the bottom surface 330 of the light guide plate 300 are spaced from each other. In addition, intervals D1, D2, D3, D4 and D5 between each two adjacent light guide units 340 can be different. For example, the interval nearer to the light incident surface 310 is greater than the interval farther away from the light incident surface 310. In other words, D1>D2>D3>D4>D5. The light emitting uniformity of the light guide plate 300c can be improved by regulating the intervals D1, D2, D3, D4 and D5 between each two adjacent light guide units 340.

In alternative embodiment, the intervals D1, D2, D3, D4 and D5 between each two adjacent light guide units 340 can be the same. In the light guide plate 300c, the first curved surface 342 and the second curved surface 344 of each of the light guide units 340 can be cylinder surfaces or spherical surfaces. In addition, the light guide plate 300 of the backlight module 200 of FIG. 2 can be replaced by the light guide plate 300c.

Figure 6:
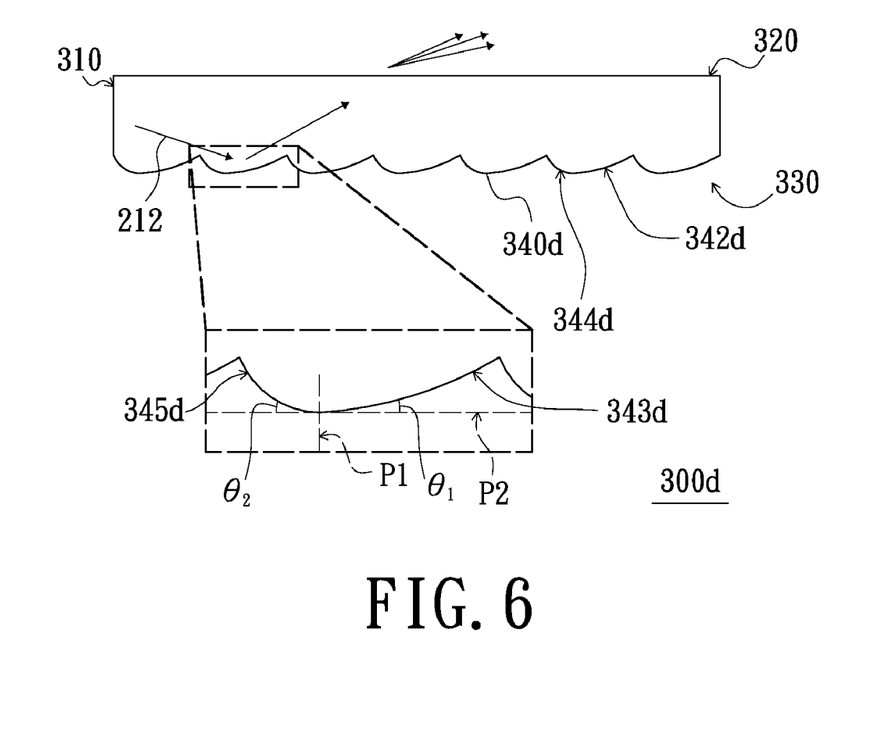
FIG. 6 is a schematic cross-sectional view of a light guide plate according to another embodiment of the present invention.

FIG. 6 is a schematic cross-sectional view of a light guide plate according to another embodiment of the present invention. Referring to FIG. 6, the light guide units 340d of the light guide plate 300d of the present embodiment are protruded out from the bottom surface 330. In a cross section that is perpendicular to the light incident surface 310 and passes through the first curved surfaces 342d and the second curved surfaces 344d, a first curved surface 342d and the cross section intersect in a first curved line 343d, and a second curved surface 344d and the cross section intersect in a second curved line 345d. Both of the first curved line 343d and the second curved line 345d are convex lines. In other words, both of the first curved surface 342d and the second curved surface 344d are convex surfaces. In each of the light guide units 340d, the second curved line 345d is nearer to the light incident surface 310 relative to the first curved line 343d. That means that the second curved surface 344d is nearer to the light incident surface 310 relative to the first curved surface 342d. A curvature radius of the first curved line 343d is greater than that of the second curved 345*d*. The curvature radius of the first curved line 343*d* is, for example, R1, and 100 micrometers<R1<∞. The curvature radius of the second curved line 345*d* is, for example, R2, and 100 micrometers<R2<300 micrometers. In addition, an included angle θ1 defined between a tangent of any one of points on the first curved line 343*d* and the second reference plane P2 is in the range from 0.1 degrees to 15 degrees. An included angle θ2 defined between a tangent of any one of points on the second curved line 345*d* and the second reference plane P2 is in the range from 10 degrees to 60 degrees.

Due to each of the light guide units 340*d* being protruded out from the bottom surface 330, both of the first curved surface 342*d* and the second curved surface 344*d* being convex surfaces and the second curved line 345*d* with the smaller curvature radius being nearer to the light incident surface 310 relative to the first curved line 343*d* (i.e. in each of the light guide units 340*d*, the first curved surface 342*d* being located at right of the first reference plane P1, and the second curved surface 344*d* being located at left of the first reference plane P1), most of the light rays 212 can be reflected to the light emitting surface 320 of the light guide plate 300*d* by the first curved surfaces 342*d* of the light guide units 340*d*, and then emit from the light emitting surface 320 of the light guide plate 300*d*. Therefore, the light guide plate 300*d* of the present embodiment has relatively high light emitting efficiency, and light emitting angles of the light rays 212 emitting from the light guide plate 300*d* can be uniformed. The light guide plate 300*d* of the present embodiment has advantages similar to the light guide plate 300 of FIG. 2. The light guide plate 300 of the backlight module 200 of FIG. 2 can be replaced by the light guide plate 300*d*. In addition, in the light guide plate 300*d*, the first curved surface 342*d* and the second curved surface 344*d* of each of the light guide units 340*d* can be cylinder surfaces or spherical surfaces. The light guide units 340*d* can be spaced from each other on the bottom surface 330.

In above embodiments, the light guide units are all disposed on the bottom surfaces. However, in the present invention, the light guide units can be disposed on the light emitting surface. Embodiments about the light guide units disposed on the light emitting surface would be described as follows.

Figure 7:
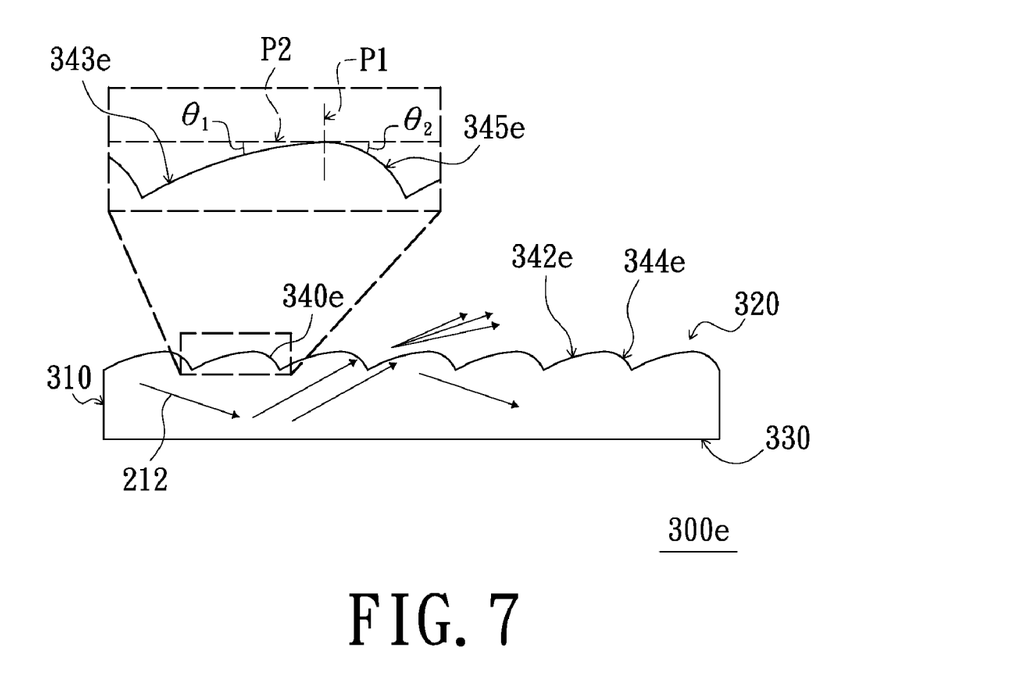
FIG. 7 is a schematic cross-sectional view of a light guide plate according to another embodiment of the present invention.

FIG. 7 is a schematic cross-sectional view of a light guide plate according to another embodiment of the present invention. Referring to FIG. 7, the light guide units 340*e* of the light guide plate 300*e* of the present embodiments are protruded out from the light emitting surface 320. In a cross section that is perpendicular to the light incident surface 310 and passes through a first curved surfaces 342*e* and a second curved surfaces 344*e*, the first curved surface 342*e* and the cross section intersect in a first curved line 343*e*, and the second curved surface 344*e* and the cross section intersect in a second curved line 345*e*. Both of the first curved line 343*e* and the second curved line 345*e* are convex lines. In other words, both of the first curved surface 342*e* and the second curved surface 344*e* are convex surfaces. In each of the light guide units 340*e*, the first curved line 343*e* is nearer to the light incident surface 310 relative to the second curved line 345*e*. That means that the first curved surface 342*e* is nearer to the light incident surface 310 relative to the second curved surface 344*e*. A curvature radius of the first curved line 343*e* is greater than that of the second curved 345*e*. The curvature radius of the first curved line 343*e* is, for example, R1, and 100 micrometers<R1<∞. The curvature radius of the second curved line 345*e* is, for example, R2, and 100 micrometers<R2<300 micrometers. In addition, an included angle θ1 defined between a tangent of any one of points on the first curved line 343*e* and the second reference plane P2 is in the range from 0.1 degrees to 15 degrees. An included angle θ2 defined between a tangent of any one of points on the second curved line 345*e* and the second reference plane P2 is in the range from 10 degrees to 60 degrees.

In the present embodiment, each of the light guide units 340*e* is protruded out from the light emitting surface 320. Both of the first curved surface 342*e* and the second curved surface 344*e* are convex surfaces. The first curved line 343*e* having the greater curvature radius is nearer to the light incident surface 310 relative to the second curved line 345*e*. That is, in each of the light guide units 340*e*, the first curved surface 342*e* is located at left of the first reference plane P1, and the second curved surface 344*e* is located at right of the first reference plane P1. As such, most of the light rays 212 transmitting to the second curved surface 344*e* would emit from the second curved surface 344*e*. Most of the light rays 212 transmitting to the first curved surface 342*e* would be reflected to the bottom surface 330, and then emit from the second curved surface 344*e* after being reflected at least one time.

Most of the light rays 212 can emit from the second curved surface 344*e*. Therefore, the light guide plate 300*e* of the present embodiment has relatively high light emitting efficiency, and light emitting angles of the light rays 212 emitting from the light guide plate 300*e* can be uniformed. The light guide plate 300*e* of the present embodiment has advantages similar to the light guide plate 300 of FIG. 2. The light guide plate 300 of the backlight module 200 of FIG. 2 can be replaced by the light guide plate 300*e*. In addition, in the light guide plate 300*e*, the first curved surface 342*e* and the second curved surface 344*e* of each of the light guide units 340*e* can be cylinder surfaces or spherical surfaces. The light guide units 340*e* can be spaced from each other on the light emitting surface 320.

Figure 8:
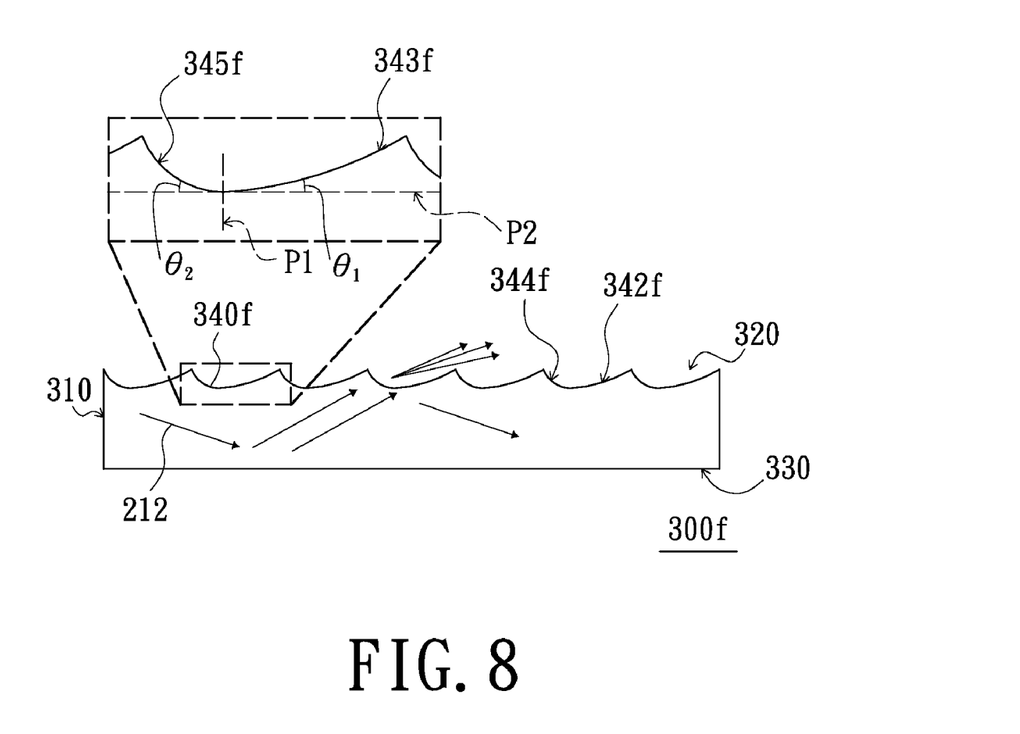
FIG. 8 is a schematic cross-sectional view of a light guide plate according to another embodiment of the present invention.

FIG. 8 is a schematic cross-sectional view of a light guide plate according to another embodiment of the present invention. Referring to FIG. 8, the light guide units 340*f* of the light guide plate 300*f* of the present embodiment are concaved in the light emitting surface 320. In a cross section that is perpendicular to the light incident surface 310 and passes through the first curved surface 342*f* and the second curved surface 344*f*, the first curved surface 342*f* and the cross section intersect in a first curved line 343*f*, and the second curved surface 344*f* and the cross section intersect in a second curved line 345*f*. Both of the first curved line 343*f* and the second curved line 345*f* are concave lines. In other words, both of the first curved surface 342*f* and the second curved surface 344*f* are concave surfaces. In each of the light guide units 340*f*, the second curved line 345*f* is nearer to the light incident surface 310 relative to the first curved line 343*f*. That means that the second curved surface 344*f* is nearer to the light incident surface 310 relative to the first curved surface 342*f*. A curvature radius of the first curved line 343*f* is greater than that of the second curved 345*f*. The curvature radius of the first curved line 343*f* is, for example, R1, and 100 micrometers<R1<∞. The curvature radius of the second curved line 345*f* is, for example, R2, and 100 micrometers<R2<300 micrometers. In addition, an included angle θ1 defined between a tangent of any one of points on the first curved line 343*f* and the second reference plane P2 is in the range from 0.1 degrees to 15 degrees. An included angle θ2 defined between a tangent of any one of points on the second curved line 345*f* and the second reference plane P2 is in the range from 10 degrees to 60 degrees.

In the present embodiment, each of the light guide units 340*f* is concaved in the light emitting surface 320. Both of the first curved surface 342f and the second curved surface 344f are concave surfaces. The second curved line 345f having the smaller curvature radius is nearer to the light incident surface 310 of the light guide plate 300f relative to the first curved line 343f. That is, in each of the light guide units 340f, the first curved surface 342f is located at right of the first reference plane P1, and the second curved surface 344f is located at left of the first reference plane P1. As such, most of the light rays 212 transmitting to the second curved surface 344f would emit from the second curved surface 344f. Most of the light rays 212 transmitting to the first curved surface 342f would be reflected to the bottom surface 330, and then emit from the second curved surface 344f after being reflected at least one time.

Most of the light rays 212 can emit from the second curved surface 344f. Therefore, the light guide plate 300f of the present embodiment has relatively high light emitting efficiency, and light emitting angles of the light rays 212 emitting from the light guide plate 300f can be uniform. The light guide plate 300f of the present embodiment has advantages similar to the light guide plate 300 of FIG. 2. The light guide plate 300 of the backlight module 200 of FIG. 2 can be replaced by the light guide plate 300f. In addition, in the light guide plate 300f, the first curved surface 342f and the second curved surface 344f of each of the light guide units 340f can be cylinder surfaces or spherical surfaces. The light guide units 340f can be spaced from each other on the light emitting surface 320.

In summary, each of the light guide units of the light guide plate of the present invention has the first curved surface and second curved surface. The light emitting angles of the light rays can be regulated by adjusting the curvature radiuses of the first curved line and the second curved line. Therefore, the light guide plate has relatively high light emitting efficiency, and the light emitting angles of the light rays emitting from the light guide plate can be uniformed. In this regard, the backlight module using the light guide plate has relatively high light utilization efficiency. Accordingly, the brightness and the uniformity of the plane light source provided by the backlight module of the present invention can be improved without increasing power consumption.

The above description is given by way of example, and not limitation. Given the above disclosure, one skilled in the art could devise variations that are within the scope and spirit of the invention disclosed herein, including configurations ways of the recessed portions and materials and/or designs of the attaching structures. Further, the various features of the embodiments disclosed herein can be used alone, or in varying combinations with each other and are not intended to be limited to the specific combination described herein. Thus, the scope of the claims is not to be limited by the illustrated embodiments.

What is claimed is:

1. A light guide plate having a light incident surface, a light emitting surface and a bottom surface, the bottom surface being opposite to the light emitting surface, the light incident surface being connected between the light emitting surface and the bottom surface, the bottom surface having a plurality of light guide units disposed thereon, the light guide units being protruded out from the bottom surface, each of the light guide units having a first curved surface and a second curved surface connected with the first curved surface, both of the first curved surface and the second curved surface being convex surfaces, in a cross section perpendicular to the light incident surface and the bottom surface and passing through the first curved surface and the second curved surface, the first curved surface and the cross section intersecting in a first curved line, the second curved surface and the cross section intersecting in a second curved line, a curvature radius of the first curved line being greater than a curvature radius of the second curved line, in each of the light guide units, the second curved line being nearer to the light incident surface relative to the first curved line, and both of the first curved line and the second curved line being convex lines, wherein, a joint of the first curved surface and the second curved surface is located at a first reference plane parallel with the light incident surface, the curvature radius of the first curved line is R1, 100 micrometers<R1<∞, the curvature radius of the second curved line is R2, 100 micrometers<R2<300 micrometers, an included angle defined between a tangent of any one of points on the first curved line and a second reference plane parallel with the bottom surface and the light emitting surface is in the range from 0.1 degrees to 15 degrees, and an included angle defined between a tangent of any one of points on the second curved line and the second reference plane is in the range from 10 degrees to 60 degrees.

2. The light guide plate as claimed in claim 1, wherein a maximum length of each of the light guide units along a first direction is L1, a maximum length of each of the light guide units along a second direction is L2, the first direction is parallel with a long axis of the light incident surface, the second direction is perpendicular to the first direction, and 1≦L1/L2≦∞.

3. The light guide plate as claimed in claim 1, wherein the light guide units are spaced from each other.

4. The light guide plate as claimed in claim 3, wherein intervals between each two adjacent light guide units are different.

5. The light guide plate as claimed in claim 1, wherein each two adjacent light guide units abut against each other.

6. A light guide plate having a light incident surface, a light emitting surface and a bottom surface, the bottom surface being opposite to the light emitting surface, the light incident surface being connected between the light emitting surface and the bottom surface, the light emitting surface having a plurality of light guide units disposed thereon, each of the light guide units protruded out from the light emitting surface and having a first curved surface and a second curved surface connected with the first curved surface, both of the first curved surface and the second curved surface being convex surfaces, in a cross section perpendicular to the light incident surface and the bottom surface and passing through the first curved surface and the second curved surface, the first curved surface and the cross section intersecting in a first curved line, the second curved surface and the cross section intersecting in a second curved line, a curvature radius of the first curved line being greater than a curvature radius of the second curved line, the first curved line being nearer to the light incident surface relative to the second curved line, and both of the first curved line and the second curved line being convex lines.

7. A light guide plate having a light incident surface, a light emitting surface and a bottom surface, the bottom surface being opposite to the light emitting surface, the light incident surface being connected between the light emitting surface and the bottom surface, the bottom surface having a plurality of light guide units disposed thereon, the light guide units being concaved in the bottom surface, each of the light guide units having a first curved surface and a second curved surface connected with the first curved surface, both of the first curved surface and the second curved surface being concave surfaces, in a cross section perpendicular to the light incident surface and the bottom surface and passing through the first curved surface and the second curved surface, the first curved surface and the cross section intersecting in a first curved line, the second curved surface and the cross section intersecting in a second curved line, a curvature radius of the first curved line being greater than a curvature radius of the second curved line, in each of the light guide units, the first curved line being nearer to the light incident surface relative to the second curved line, and both of the first curved line and the second curved line being concave lines,     wherein, a joint of the first curved surface and the second curved surface is located at a first reference plane parallel with the light incident surface, the curvature radius of the first curved line is R1, 100 micrometers<R1<∞, the curvature radius of the second curved line is R2, 100 micrometers<R2<300 micrometers, an included angle defined between a tangent of any one of points on the first curved line and a second reference plane parallel with the bottom surface and the light emitting surface is in the range from 0.1 degrees to 15 degrees, and an included angle defined between a tangent of any one of points on the second curved line and the second reference plane is in the range from 10 degrees to 60 degrees.

8. A light guide plate having a light incident surface, a light emitting surface and a bottom surface, the bottom surface being opposite to the light emitting surface, the light incident surface being connected between the light emitting surface and the bottom surface, the bottom surface having a plurality of light guide units disposed thereon, the light guide units being spaced from each other, each of the light guide units having a first curved surface and a second curved surface connected with the first curved surface, both of the first curved surface and the second curved surface being concave surfaces or convex surfaces, in a cross section perpendicular to the light incident surface and the bottom surface and passing through the first curved surface and the second curved surface, the first curved surface and the cross section intersecting in a first curved line, the second curved surface and the cross section intersecting in a second curved line, and a curvature radius of the first curved line being greater than a curvature radius of the second curved line.

9. The light guide plate as claimed in claim 8, wherein intervals between each two adjacent light guide units are different.

* * * * *